United States Patent
Murison et al.

(10) Patent No.: US 8,508,843 B2
(45) Date of Patent: Aug. 13, 2013

(54) LASER SYSTEMS WITH DOPED FIBER COMPONENTS

(75) Inventors: Richard Murison, St-Lazare (CA); Tullio Panarello, St-Lazare (CA)

(73) Assignee: Electro Scientific Industries, Inc., Portland, OR (US)

(*) Notice: Subject to any disclaimer, the term of this patent is extended or adjusted under 35 U.S.C. 154(b) by 802 days.

(21) Appl. No.: 12/263,378

(22) Filed: Oct. 31, 2008

(65) Prior Publication Data

US 2010/0110535 A1    May 6, 2010

(51) Int. Cl.
    *H04B 10/17* (2006.01)
(52) U.S. Cl.
    USPC .......... 359/341.1; 359/337; 385/27; 385/31
(58) Field of Classification Search
    USPC ............. 359/337, 341.1; 385/27, 31; 372/6
    See application file for complete search history.

(56) References Cited

U.S. PATENT DOCUMENTS

| | | | |
|---|---|---|---|
| 4,867,518 A * | 9/1989 | Stamnitz et al. | 359/341.2 |
| 5,216,728 A * | 6/1993 | Charlton et al. | 385/27 |
| 5,867,305 A * | 2/1999 | Waarts et al. | 359/337.12 |
| 6,084,717 A | 7/2000 | Wood et al. | |
| 6,151,338 A | 11/2000 | Grubb et al. | |
| 6,186,631 B1 * | 2/2001 | Behringer et al. | 359/344 |
| 6,324,326 B1 | 11/2001 | Dejneka et al. | |
| 6,335,941 B1 | 1/2002 | Grubb et al. | |
| 6,347,007 B1 | 2/2002 | Grubb et al. | |
| 6,356,383 B1 | 3/2002 | Cornwell, Jr. et al. | |
| 6,433,306 B1 | 8/2002 | Grubb et al. | |
| 6,434,302 B1 * | 8/2002 | Fidric et al. | 385/43 |
| 6,631,234 B1 * | 10/2003 | Russell et al. | 385/125 |
| 6,771,413 B2 | 8/2004 | Cornwell, Jr. et al. | |
| 6,782,028 B2 | 8/2004 | Tsukiji et al. | |
| 7,133,193 B2 | 11/2006 | Cornwell, Jr. et al. | |
| 7,440,188 B2 | 10/2008 | Fuse | |
| 7,443,893 B2 | 10/2008 | Murison et al. | |
| 7,738,166 B2 | 6/2010 | Murison et al. | |
| 7,796,654 B2 | 9/2010 | Murison et al. | |
| 2007/0041083 A1 * | 2/2007 | Di Teodoro et al. | 359/333 |
| 2007/0127529 A1 * | 6/2007 | Shaw et al. | 372/3 |
| 2007/0230517 A1 | 10/2007 | Matsuda et al. | |
| 2008/0130102 A1 | 6/2008 | Murison et al. | |

OTHER PUBLICATIONS

U.S. Appl. No. 12/015,427, filed Jan. 16, 2008; first named inventor: Richard Murison.

* cited by examiner

*Primary Examiner* — Eric Bolda

(57) ABSTRACT

A laser amplifier includes a pump source and an optically active fiber having an input portion configured to receive a signal source and an output portion. The pump source is optically coupled to the optically active fiber. The laser amplifier also includes an output fiber optically coupled to the output portion of the optically active fiber. The output fiber includes a rare-earth element. The laser amplifier further includes a beam expansion section joined to the output fiber.

9 Claims, 7 Drawing Sheets

LASER SYSTEMS WITH DOPED FIBER COMPONENTS

BACKGROUND OF THE INVENTION

The present invention relates generally to the field of optical systems. More particularly, the present invention relates to a method and apparatus for providing high power laser outputs useful for industrial applications such as trimming, marking, cutting, and welding. Merely by way of example, the invention has been applied to a relay fiber including a rare earth dopant optically coupled to an output of a fiber amplifier. However, the present invention has broader applicability and can be applied to other optical components including optical circulators, optical isolators, end caps, pump combiners, optical modulators, optical switching elements, wavelength-division multiplexing (WDM) elements, fiber gratings, beam shaping elements, optical taps, Diffractive Optical Elements (DOE), and the like.

Conventional laser-based material processing has generally used high peak power pulsed lasers, for example, Q-switched Nd:YAG lasers operating at 1064 nm, for marking, engraving, micro-machining, and cutting applications. More recently, laser systems based on fiber gain media have been developed. In some of these fiber-based laser systems, fiber amplifiers are utilized.

Some optical amplifiers and lasers utilizing a fiber gain medium are optically pumped, often by using semiconductor pump lasers. The fiber gain medium is typically made of silica glass doped with rare-earth elements. The choice of the rare-earth elements and the composition of the fiber gain medium depend on the particular application. One such rare-earth element is ytterbium, which is used for optical amplifiers and lasers emitting in the 1020 nm-1100 nm range. Another rare-earth element used in some fiber gain media is erbium, which is used for optical amplifiers and lasers emitting in the 1530 nm-1560 nm range.

The wavelength of the optical pump source used for ytterbium-doped fiber amplifiers and lasers is typically in the wavelength range of 910 nm to 980 nm. The wavelength of the optical pump source used for erbium-doped fiber amplifiers and lasers is typically in a wavelength range centered at about 980 nm or about 1480 nm.

When a fiber laser or amplifier is operated in a high power mode, variations in the electric field of the light beam in the optical fiber produce acoustic vibrations in the fiber via electrostriction. This acousto-optic interaction between light and acoustic phonons in the fiber, referred to as Stimulated Brillouin Scattering (SBS), results in an interference pattern that feeds a coherent traveling acoustic wave. This wave eventually becomes highly reflective and substantially degrades system performance. SBS tends to limit the power output available from fiber amplifier and laser systems. Thus, there is a need in the art for improved methods and systems to increase the output power of optically active fiber systems.

SUMMARY OF THE INVENTION

Embodiments of the present inventions relate to systems and methods that reduce SBS present in fibers coupled or connected to one or more optical components.

According to an embodiment of the present invention, a laser amplifier is provided. The laser amplifier includes a pump source and an optically active fiber having an input portion configured to receive a signal source and an output portion. The pump source is optically coupled to the optically active fiber. The laser amplifier also includes an output fiber optically coupled to the output portion of the optically active fiber. The output fiber includes a rare-earth element. The laser amplifier further includes a beam expansion section joined to the output fiber.

According to another embodiment of the present invention, an optical isolator system is provided. The optical isolator system includes an optically active input fiber and an optical element having an input and an output. The input is coupled to the optically active input fiber. The optical element is characterized by an optic axis, a first transmittance in a first direction along the optic axis, and a second transmittance less than the first transmittance in a second direction opposite to the first direction. The optical isolator system also includes an output fiber coupled to the output of the optical element.

According to an alternative embodiment of the present invention, a laser source is provided. The laser source includes a seed source and an optical circulator including a first port coupled to the seed source, a second port, and a third port. The laser source also includes an amplitude modulator characterized by a first side and a second side. The first side is coupled to the second port of the optical circulator. The laser source further includes a first fiber amplifier characterized by an input end and a reflective end. The input end is coupled to the second side of the amplitude modulator. The first fiber amplifier includes an active fiber section and a pump source coupled to the active fiber section by a pump coupler. The pump coupler includes a rare-earth doped fiber. Moreover, the laser source includes a second fiber amplifier coupled to the third port of the optical circulator.

According to another alternative embodiment of the present invention, an optical coupler is provided. The optical coupler includes a first fiber including an input facet configured to receive a pump source and a second fiber including an input facet configured to receive a signal source. The second fiber includes a rare-earth dopant ion. The optical coupler further includes a coupling section between the first fiber and the second fiber.

According to a specific embodiment of the present invention, an optical beam splitter is provided. The optical beam splitter includes an optically active input fiber. The optically active input fiber includes a rare-earth dopant ion. The optical beam splitter also includes an optical element having an input and at least one first output and one second output. The input is connected to the optically active input fiber. The optical element is characterized by a first beam with a first beam power in a first direction and a second beam with a second beam power in a second direction. The second direction is different from the first direction. The optical beam splitter further includes a first output fiber connected to the first output of the optical element and a second output fiber connected to the second output of the optical element.

According to particular embodiments of the present invention, an optical system is provided. The optical system includes an optical component having an input and an output. The optical component may be an optical tap, an optical modulator, an optical switching element, a wavelength-division multiplexing (WDM) element, a fiber grating, a beam shaping element, a Diffractive Optical Element (DOE), or the like. The optical system also includes an optically active fiber connected to the input of the optical component. The optically active fiber includes a rare-earth dopant ion, for example, erbium or ytterbium. In some embodiments, a second optically active fiber is connected to the output of the optical component.

In yet another embodiment, an optical system is provided that includes an optical component, for example, those listed above, having an input and an output. The optical system also includes an optically active fiber connected to the output of the optical component. The optically active fiber includes a rare-earth dopant ion, for example, erbium or ytterbium.

Numerous benefits are achieved using the present invention over conventional techniques. For example, in an embodiment according to the present invention, SBS is reduced in optical components coupled to fiber amplifier systems. The reduction in SBS enables laser systems with increased peak power in comparison to conventional systems. Various additional objects, features and advantages of the present invention can be more fully appreciated with reference to the detailed description and accompanying drawings that follow.

DETAILED DESCRIPTION OF SPECIFIC EMBODIMENTS

Figure 1:
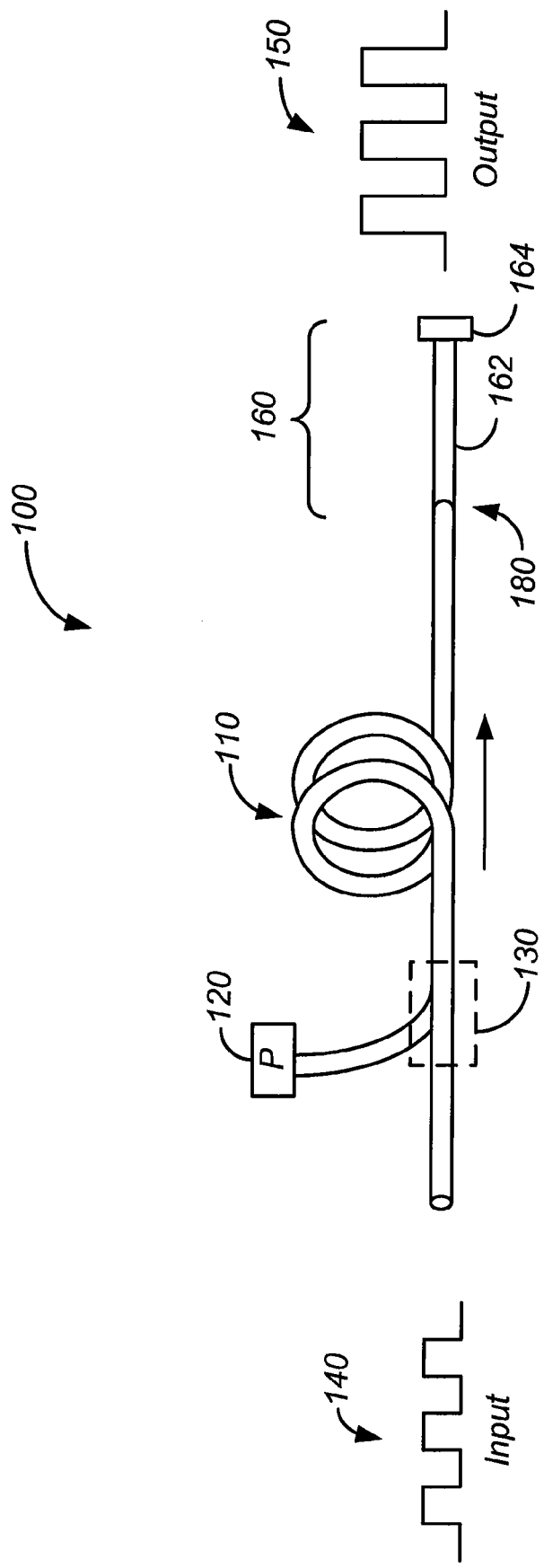
FIG. 1 is a simplified schematic illustration of a high power fiber amplifier system according to an embodiment of the present invention.

FIG. 1 is a simplified schematic illustration of a high power fiber amplifier system 100 according to an embodiment of the present invention. The fiber amplifier includes a rare-earth-doped fiber gain medium 110. The rare-earth doping is typically ytterbium for amplification of light in wavelength range around 980 nm to 1100 nm. Other rare-earth elements, like erbium, neodymium, thulium, or the like can be used for amplification at other wavelengths. In some embodiments, the doped fiber gain medium 110 is referred to as an optically active fiber. The optically active fiber includes a core extending along a central axis of the fiber and a lower index cladding coaxially surrounding the core. In some embodiments, the optically active fiber is a double clad fiber including an additional cladding layer surrounding the cladding layer adjacent the core. The core is typically made of quartz glass doped with the rare-earth ion and the cladding layers are made of quartz glass. One or more protective layers may be provided surrounding the cladding layers.

The fiber gain medium is optically pumped by at least one pump source 120 (e.g. a semiconductor laser), which is optically coupled to the fiber gain medium by a combiner 130, as is well known in the art. Optical coupling between the pump source 120 and the combiner 130, also referred to as a pump combiner, is provided by one of several techniques. A low energy input optical pulse train 140 is substantially amplified by the optical amplifier 100 to become a high energy output optical pulse train 150.

According to FIG. 1, when operated in a pulsed mode, pulses of the input train 140 are amplified to produce the output train 150. As illustrated, the intensity of the output pulses is greater than the intensity of the input pulses. In some fiber amplifier systems as illustrated in FIG. 1 or fiber laser systems, the output of the amplifier/laser at the splice location 180 is suitable for industrial applications including cutting, welding, marking, and the like. In order to reduce potential damage to the end of the fiber at splice location 180, typical fiber systems utilize a length of undoped relay fiber and an end cap that is spliced to the relay fiber. Relay fiber is a length of undoped fiber for which the waveguiding properties are designed to match or otherwise be essentially identical to the waveguiding properties of a corresponding doped fiber to which the relay fiber is spliced. Because the waveguiding properties are matched, an effective low-loss splice 180 can be used to couple the active doped fiber to the relay fiber.

An end cap 164, which is a transparent member fusion bonded or welded to the relay fiber, provides a material in which the beam can expand prior to reaching an interface with air. Thus, an end cap can be referred to as a beam expansion device or section. As the beam expands as it passes through the end cap, the beam intensity (W/cm$^2$) decreases as the beam waist expands, reducing the potential for damage at the interface with air. The end cap is typically made from synthetic quartz or other glass material and may have non-parallel faces to reduce any reflections back into the laser system. In some applications, the end cap is characterized by a uniform index of refraction, providing an unguided medium. In other applications, the end cap is characterized by a lateral index of refraction profile that provides some guiding of the beam as it passes through the end cap. Generally, the undoped relay fiber and the end cap are purchased as a package that is spliced to the active fiber at splice location 180.

As a result of the intensity of the optical output provided by the laser amplifier 100, nonlinear effects such as SBS may occur in a passive relay fiber that is spliced to the active fiber. The SBS present in the passive relay fiber tends to reduce the system power, which is undesirable for many applications. The inventors have observed that SBS is most likely to occur at high levels with longer lengths of the undoped relay fiber. Since the undoped relay fiber serves merely to transfer light from the fiber amplifier to an optical component, it follows that the buildup of SBS can be discouraged by making the undoped relay fiber as short as possible or removing it altogether.

The inventors have also determined that SBS is more likely to be observed in the undoped relay fiber than in the doped active fiber. Without limiting embodiments of the present invention, the inventors believe that the reduced SBS empirically observed in the doped fibers may be due to thermal gradients present in the doped fiber resulting from interaction between the optical mode in the doped fiber and the active ions in the doped or optically active fiber. One theory of operation, which is not intended to limit the scope of embodiments of the present invention, is that the thermal gradient present in the doped fiber results in a broadening of the effective SBS linewidth, thereby reducing SBS effects in the doped fiber. Alternatively, the inventors believe that the reduced SBS observed in the doped fiber may result from the presence of dopant ions, which may serve to reduce the phonon lifetime in the optically active fiber. Regardless of the actual physical mechanism underlying the phenomena observed by the inventors, embodiments of the present invention utilize doped fiber in place of conventional undoped fibers to reduce the presence of nonlinear effects including SBS, increase output power from fiber laser systems, and broaden the operating range of optical components utilized in conjunction with laser systems. Although some examples described herein are applied in the context of SBS, one or more other non-linear effects, including self-phase modulation (SPS), stimulated Raman scattering (SRS), and the like, are reduced by embodiments of the present invention, enabling the production of high power outputs not available using conventional techniques. One of ordinary skill in the art would recognize many variations, modifications, and alternatives.

Embodiments of the present invention provide a doped or optically active relay fiber that can be used to couple a fiber amplifier or other optical device to an optical component. Because the SBS effect is greater in undoped fiber than in doped fiber, the use of doped fiber for the relay fiber results in a reduction in SBS or other non-linear effects in one or more relay fibers attached to the optical component. Referring to FIG. 1, the output of the doped fiber 110 is coupled to optical component 160 spliced to the output portion of the active fiber 110 at splice location 180. The optical component 160 includes a doped (i.e., optically active) input relay fiber 162 coupled to an optical element 164. As described more fully throughout the present specification, the optical element may be one of a number of optical devices, such as an optical isolator, optical circulator, optical modulator, end cap, or the like. In the system illustrated in FIG. 1, the optical element 164 is an end cap that reduces the optical intensity at the glass/air interface on the right side of the end cap.

Embodiments of the present invention are not limited to the use of a doped relay fiber/end cap component coupled to the active fiber. In conventional fiber amplifier and fiber laser designs using one or more double clad doped fibers as the active element, one or more ancillary optical components, such as mode-field adapters, fiber end-caps, pump combiners, and the like, utilize lengths of undoped relay fibers. Embodiments of the present invention utilize doped or optically active relay fiber characterized by reduced SBS and other non-linear effects in comparison with conventional designs. Thus, although an end cap is illustrated in FIG. 1, embodiments of the present invention are not limited to this particular optical element. One of ordinary skill in the art would recognize many variations, modifications, and alternatives.

Figure 2:
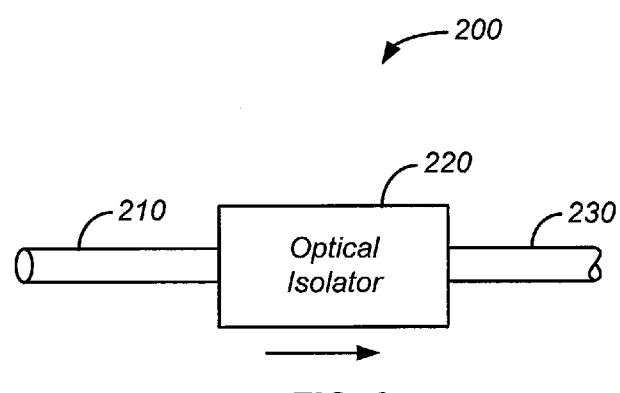
FIG. 2 is a simplified schematic diagram illustrating an optical isolator according to an embodiment of the present invention.

FIG. 2 is a simplified schematic diagram illustrating a reduced SBS optical isolator system according to an embodiment of the present invention. An optical isolator is an optical component that allows the transmission of light in substantially only one direction. Applications for optical isolators include their use to prevent unwanted reflections or feedback into a laser cavity or other optical system. Thus, optical isolators in an embodiment have an input and an output and are characterized by an optic axis. Generally, the optic axis passes from the input to the output. The optical isolator is characterized by a first transmittance in a first direction along the optic axis and a second transmittance less than the first transmittance in a second direction opposite to the first direction. One of ordinary skill in the art would recognize many variations, modifications, and alternatives.

The optical isolator system 200 includes a first relay fiber 210, which may also be referred to as a first fiber pigtail optically coupled to an optical isolator 220, which is optically coupled to a second relay fiber 230. The optical isolator 220 may be one of several types, including a Faraday rotation-based, a calcite polarizer-based, a Brewster's angle plate polarizer-based isolator, or the like. The first fiber pigtail 210 is an optically active or doped fiber according to embodiments of the present invention. In a particular application, the input of the first relay fiber is spliced to an output of a fiber laser or fiber amplifier. In addition to providing waveguiding suitable for a low-loss splice, the doped relay fiber 210 serves to reduce SBS present in the relay fiber. Thus, the reduction in the amount of SBS present in the relay fiber results in less backward coupling of radiation into the laser or amplifier. Thus, by utilizing the optical isolator system illustrated in FIG. 2, the power available at the output of the optical isolator system is increased.

The doped relay fiber 210 may be a single mode or a multimode fiber. Additionally, the doped relay fiber may be a single clad, double clad, or other multiple clad optical fiber. In a particular embodiment, the core of a double clad fiber is doped with a rare-earth ion such as erbium, ytterbium, neodymium, thulium, or the like. The dopant levels in the relay fiber may be equal to the dopant levels in the active fiber used in a laser or amplifier system. Alternatively, the dopant levels in the relay fiber may be less than or greater than dopant levels in systems coupled to the doped relay fiber. The dopant levels in the relay fiber may be substantially constant as a function of fiber length or vary as appropriate to the particular application.

In another embodiment, both the first relay fiber 210 and the second relay fiber 230 are doped fibers characterized by reduced SBS effects. In an alternative embodiment, only the second relay fiber 230 is a doped fiber.

Although a doped relay fiber has been applied in the context of an optical isolator in the embodiment illustrated in FIG. 2, embodiments of the present invention are not limited to this particular optical component. Other optical components in which the laser intensity is such that non-linear effects, including SBS, are not insignificant are also included within the scope of the present invention. Thus, embodiments of the present invention utilize doped relay fiber in conjunction with various different optical components. As examples, a number of various optical components including doped relay fibers are described more particularly throughout the present specification.

Figure 3:
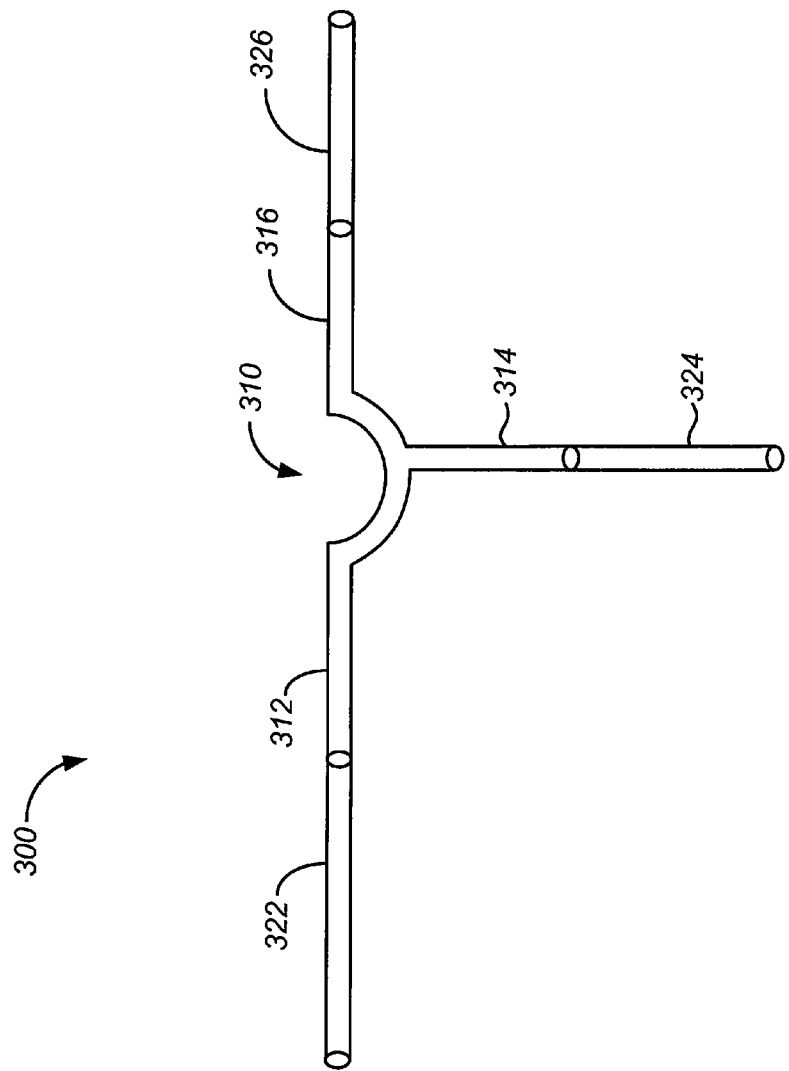
FIG. 3 is a simplified schematic diagram of an optical circulator system with reduced SBS according to an embodiment of the present invention.

As illustrated by the doped relay fiber and end cap in FIG. 1, embodiments of the present invention provide doped relay fiber in combination with one or more optical elements. FIG. 3 is a simplified schematic diagram of an optical circulator system with reduced SBS effects according to an embodiment of the present invention. The optical circulator system 300 illustrated in FIG. 3 includes a three port optical circulator 310. The three port optical circulator 310 has an input end 312, a dual-purpose input/output end 314, and an output end 316. In embodiments that use a four port optical circulator, an additional dual-purpose input/output end (not illustrated) is provided in addition to the dual purpose input/output end 314. One of ordinary skill in the art would recognize many variations, modifications, and alternatives.

Generally, conventional optical circulators are passive devices that apply the Faraday effect or another non-reciprocal optical process to cause light to pass from port 1 (312) to port 2 (314) to port 3 (316) in a single direction. Light entering at port 2 will pass to port 3. Typical optical circulators are packaged with a length (e.g., 1 meter) of undoped relay fiber connected to each of the ports or ends. In the embodiment of the present invention illustrated in FIG. 3, a length of doped relay fiber 322 is utilized to provide the input to the input end 312, a second length of doped relay fiber 324 is utilized to provide/receive the input/output to/from the dual-purpose input/output end 314, and a third length of doped relay fiber is utilized to transmit the output from the output end 316. In other embodiments, only one of the relay fibers 322/324/326 are doped as appropriate to the particular application. In yet other embodiments, two of the three relay fibers are doped as appropriate to other particular applications. In embodiments utilizing a four port optical circulator, one, two, three, or all four relay fibers are doped to reduce SBS effects.

In applications in which a high power input is provided to the input end 312 of the optical circulator, the use of a doped relay fiber 322 will reduce the SBS effect in the optical circulator package 300 and thereby improve system performance. In applications in which a high power input is provided at the dual-purpose input/output end 314, the use of a doped relay fiber 324 will reduce the SBS effect in the optical circulator package 300 and thereby improve system performance. One of ordinary skill in the art would recognize many variations, modifications, and alternatives. As an example of a system with a high power input at the dual-purpose input/output end 314, reference is made to FIG. 5 in which light from the double-pass amplifier 550 is input into the optical circulator 520 after passing through the amplitude modulator 530.

Figure 4:
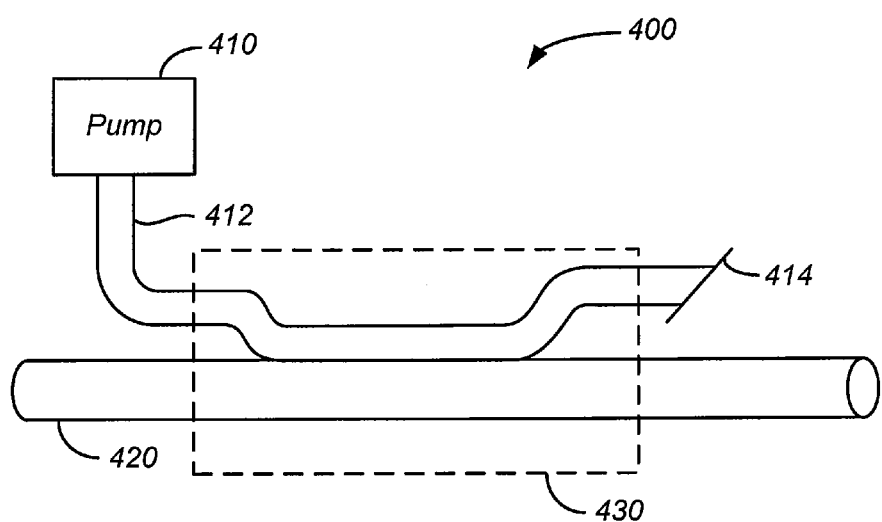
FIG. 4 is a simplified schematic diagram illustrating a pump combiner with reduced SBS according to an embodiment of the present invention.

According to another embodiment of the present invention, a pump combiner includes a section of doped or active fiber. FIG. 4 is a simplified schematic diagram illustrating a pump combiner 400 with reduced SBS according to an embodiment of the present invention. A pump combiner, sometimes referred to as a pump coupler or a fiber combiner, is an optical element that receives pump light from a pump source and signal light from a signal source and injects the two received signals into a fiber optic cable. Various architectures of pump combiners are included within the scope of embodiments of the present invention. In a particular architecture, a length of fiber configured to receive the pump light (pump fiber) and a length of fiber configured to receive the signal light (signal fiber) are brought into physical contact and heated to fuse the fibers. As pump light in the pump fiber passes through the fused fiber portion, optical coupling between the fibers transfers the pump light from the pump fiber to the signal fiber.

In conventional pump combiner designs, the pump fiber and the signal fiber are undoped relay fibers. Thus, both the pump light and signal light are injected into undoped relay fiber. The undoped signal fiber is then connected to one end of a length of doped or active fiber, e.g., an input of a fiber amplifier. In the embodiment of the present invention illustrated in FIG. 4, pump light from pump source 410 is injected into pump fiber 412. Signal light is injected from a signal source (not shown) into signal fiber 420. In the illustrated embodiment, the pump fiber and the signal fiber are joined in fused or coupling section 430. The pump fiber is terminated by an angled cleaved facet 414 to reduce stray reflections back into the pump fiber. The signal fiber 420 is an active fiber in an embodiment of the present invention, thereby reducing SBS present in the signal fiber. In another embodiment, the pump combiner injects both the signal light and the pump light into a length of doped fiber.

According to an embodiment of the present invention, a pump combiner includes a pump fiber having a first end configured to receive a pump source and a second end. The second end may be terminated by an angled facet. The pump combiner also includes a signal fiber optically coupled to the pump fiber in a coupling section. The coupling section may include a fused section in which light propagating in the pump fiber enters into and propagates in the signal fiber. Thus, the cladding sections of the pump fiber and the signal fiber may be fused to enable one or more modes propagating in the pump fiber to couple into the cladding of the signal fiber (e.g., into an inner cladding of a double-clad signal fiber). Various designs of pump combiners or pump couplers are included within the scope of embodiments of the present invention. The signal fiber includes a first end configured to receive signal light and a second end configured to support both the pump light and the signal light. The coupling section is disposed between the first end and the second end. The signal fiber is an optically active fiber, for example, including a rare-earth doped core.

The active signal fiber will provide for reductions in SBS occurring in the signal fiber, thereby improving system performance. The output end of the active signal fiber is typically spliced to the input of the active fiber of a fiber amplifier section. Thus, embodiments of the present invention provide pump combiners that are drop-in replacements for conventional pump combiners, while providing benefits (e.g., reduced SBS) not available using conventional pump combiners.

Figure 5:
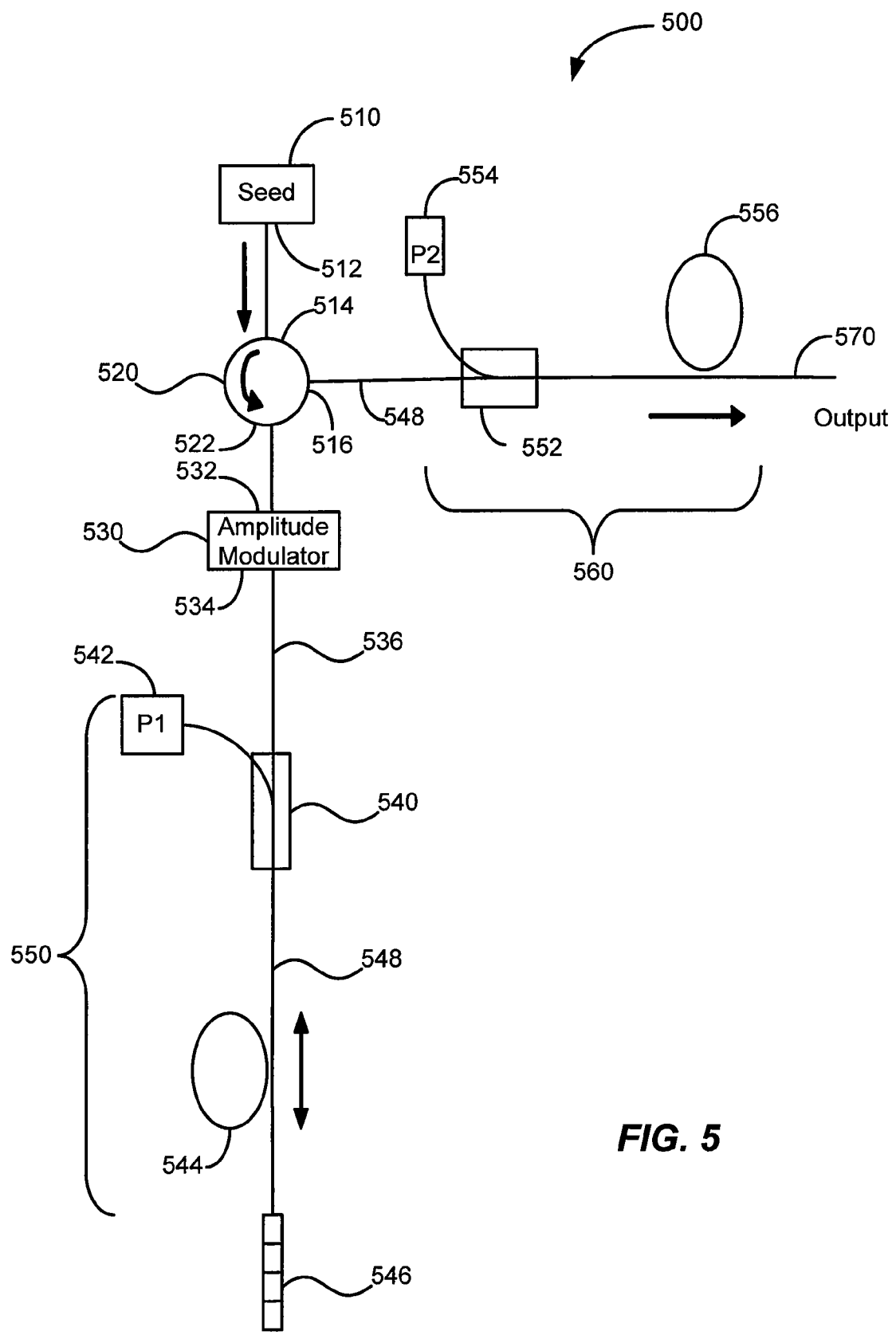
FIG. 5 is a simplified schematic diagram illustrating a high power fiber amplifier according to an embodiment of the present invention.

FIG. 5 is a simplified schematic diagram illustrating a high power fiber amplifier according to an embodiment of the present invention. High power pulsed amplifier 500 includes a seed source 510 that generates a seed signal (either pulsed or CW) that is injected into a first port 514 of an optical circulator 520. According to an embodiment of the present invention, the optical seed signal is generated by using a seed source 510 that is a continuous wave (CW) semiconductor laser. In a particular embodiment, the CW semiconductor laser is a fiber Bragg grating (FBG) stabilized semiconductor diode laser operating at a wavelength of 1032 nm with an output power of 20 mW. In another particular embodiment, the CW semiconductor laser is an external cavity semiconductor diode laser operating at a wavelength of 1064 nm with an output power of 100 mW. The output power may be lower or greater than 100 mW. For example, the output power can be 50 mW, 150 mW, 200 mW, 250 mW, or the like. In alternative embodiments, the seed signal is generated by a compact solid-state laser or a fiber laser. One of ordinary skill in the art would recognize many variations, modifications, and alternatives.

After passing through the optical circulator 520, the seed signal exits from a second port 522 of the circulator 520 and impinges on a first side 532 of an optical amplitude modulator 530. Circulators are well known in the art and are available from several suppliers, for example, model OC-3-1064-PM from OFR, Inc. of Caldwell, N.J.

The optical amplitude modulator 530 is normally held in an "off" state, in which the signal impinging on the modulator is not transmitted. According to embodiments of the present invention, optical amplitude modulator provides amplitude modulation and time-domain filtering of the seed signal as well as amplified spontaneous emission (ASE) filtering. In a particular embodiment, the length of the optical pulse is determined by the operation of the optical amplitude modulator 530, which may be an APE-type Lithium Niobate Mach-Zehnder modulator having a bandwidth>3 GHz at 1064 nm.

According to embodiments of the present invention, the optical amplitude modulator 530 is an electro-optic Mach-Zehnder type modulator, which provides the bandwidth necessary for generating short optical pulses. In other embodiments, the optical amplitude modulator 530 is a phase or frequency modulator with a suitable phase or frequency to amplitude converter, such as an edge optical filter, an extinction modulator, or an acousto-optic modulator. For example, an electro-optic phase modulator can induce a frequency chirp to the optical signal, which would be converted into an amplitude modulation when the optical signal is transmitted through a short or long pass optical filter. Preferably, the optical signal would be characterized by a wavelength that experiences high loss when no electrical signal is applied to the electro-optic phase modulator. When an electrical signal is applied to the electro-optic phase modulator, the optical signal preferably experiences a change in wavelength or frequency chirp to a value characterized by low optical loss.

In order to pass the seed signal, the optical amplitude modulator 530 is pulsed to the "on" state for a first time to generate an optical pulse along optical path 536. The pulse width and pulse shape of the optical pulse generated by the optical amplitude modulator 530 are controlled by the modulator drive signal applied to the optical amplitude modulator 530. The optical pulse then passes for a first time through a first optical amplifier 550, where it is amplified. According to embodiments of the present invention, the amplitude modulator, driven by a time varying drive signal, provides time-domain filtering of the seed signal, thereby generating a laser pulse with predetermined pulse characteristics, including pulse width, pulse shape, and pulse repetition rate.

According to an embodiment of the present invention, the optical amplifier 550 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include ytterbium, erbium, holmium, praseodymium, thulium, or neodymium. In a particular embodiment, one or more of the fiber-optic based components utilized in constructing optical amplifier 550 utilize polarization-maintaining single-mode fiber.

Referring to FIG. 5, in embodiments utilizing fiber amplifiers, a pump 542 is coupled to a rare-earth-doped fiber loop 544 through optical coupler 540. In the embodiment illustrated in FIG. 5, the optical coupler 540 includes doped relay fibers as described in relation to FIG. 4. Thus, SBS is reduced in the doped coupler according to embodiments of the present invention. Generally, a semiconductor pump laser is used as pump 542. One of ordinary skill in the art would recognize many variations, modifications, and alternatives. In alternative embodiments, the optical amplifier 550 is a solid-state amplifier including, but not limited to, a solid-state rod amplifier, a solid-state disk amplifier, or gaseous gain media.

In a particular embodiment, the optical amplifier 550 includes a 5 meter length of rare-earth doped fiber 544, having a core diameter of approximately 4.1 µm, and doped with ytterbium to a doping density of approximately $4 \times 10^{24}$ ions/$m^3$. The amplifier 550 also includes a pump 542, which is an FBG-stabilized semiconductor laser diode operating at a wavelength of 976 nm, and having an output power of 100 mW. The output power can be lower or greater than 100 mW. For example, it can be 50 mW, 150 mW, 200 mW, 250 mW, 300 mW, 350 mW, 400 mW, or the like. In another particular embodiment, the pump 142 is a semiconductor laser diode operating at a wavelength of about 915 nm. In yet another particular embodiment, the pump 542 is a semiconductor laser diode operating at an output power of 450 mW or more. In a specific embodiment, the amplifier 550 also includes a pump to fiber coupler 540, which is a WDM pump combiner including doped relay fiber.

The signal emerging from optical amplifier 550 along optical path 548 then impinges on a reflecting structure 546, and is reflected back into optical amplifier 550. The signal passes for a second time through optical amplifier 550, wherein the signal is amplified. The reflecting structure 546 performs spectral domain filtering of the laser pulse and of the amplified spontaneous emission (ASE) propagating past optical path 548. Thus, the seed signal experiences both amplitude and time-domain modulation passing through amplitude modulator 530, and spectral-domain filtering upon reflection from reflecting structure 546.

In an embodiment, the reflecting structure 546 is a fiber Bragg grating (FBG) that is written directly in the fiber used as the optical amplifier 550. The periodicity and grating characteristics of the FBG are selected to provide desired reflectance coefficients as is well known in the art. Merely by way of example in a particular embodiment, the reflecting structure 546 is a FBG having a peak reflectance greater than 90%, and a center wavelength and spectral width closely matched to the output of the seed source 510.

The signal emerging from optical amplifier 550 along optical path 536 impinges on the second side 534 of the optical amplitude modulator 530, which is then pulsed to the "on" state a second time to allow the incident pulse to pass through. According to embodiments of the present invention, the timing of the second "on" pulse of the optical amplitude modulator 530 is synchronized with the first opening of the modulator 530 (first "on" pulse) to take account of the transit time of the signal through the amplifier 550 and the reflecting structure 546. After emerging from the first side of the optical amplitude modulator 530, the amplified pulse then enters the second port 522 of optical circulator 520, and exits from the third port 516 of optical circulator 520 along optical path 548. In some embodiments, the intensity passing through the optical circulator 520 is sufficient to result in SBS in the fibers utilized in conjunction with the optical circulator. Thus, some embodiments, utilize an optical circulator including doped relay fibers are described in relation to FIG. 3.

The signal is then amplified as it passes through a second optical amplifier 560. Embodiments of the present invention utilize a fiber amplifier as optical amplifier 560, including a pump 554 that is coupled to a rare-earth-doped fiber loop 556 through an optical coupler 552. As discussed in relation to the optical coupler 540, some embodiments utilize doped relay fiber to decrease the incidence of SBS in the optical coupler 552.

Generally, a semiconductor pump laser is used as pump 554, although pumping of optical amplifiers can be achieved by other means as will be evident to one of skill in the art. In a particular embodiment, the second optical amplifier 560 includes a 5 meter length of rare-earth doped fiber 556, having a core diameter of approximately 4.8 µm, and is doped with ytterbium to a doping density of approximately $6 \times 10^{24}$ ions/$m^3$. The amplifier 560 also includes a pump 554, which is an FBG-stabilized semiconductor laser diode operating at a wavelength of 976 nm, and having an output power of 500 mW. In another particular embodiment, the second optical amplifier 560 includes a 2 meter length of rare-earth doped fiber 556, having a core diameter of approximately 10 µm, and is doped with ytterbium to a doping density of approximately $1 \times 10^{26}$ ions/$m^3$. The fiber length can be shorter or longer than 2 meters. For example, it can be 1.0 m, 3.0 m, 3.5 m, 4.0 m, 4.5 m, 5.0 m, or the like. The amplifier 560 can also include a multimode pump 554, which is a semiconductor laser diode having an output power of 5 W. The output power can be lower or greater than 5 W. For example, it can be 3 W, 4 W, 6 W, 7 W, 8 W, 9 W, 10 W, or the like.

In an embodiment, the fiber 570 at the output of the rare-earth doped fiber 556 is a doped fiber optically coupled to an end cap as discussed in relation to FIG. 1. Thus, at the output of the second amplifier 560, where the pulsed light intensity is high, doped relay fibers are utilized in conjunction with an end cap (not shown) to reduce the incidence of SBS in the amplifier system.

Although FIG. 5 illustrates the use of a single optical amplifier 560 coupled to the third port of the optical circulator 520, this is not required by the present invention. In alternative embodiments, multiple optical amplifiers are utilized downstream of the optical circulator 520 as appropriate to the particular applications. Doped relay fiber in optical couplers could also be utilized as appropriate in multiple optical amplifier designs. One of ordinary skill in the art would recognize many variations, modifications, and alternatives.

Although embodiments of the present invention have been discussed in relation to the fiber amplifier system illustrated in FIG. 5, embodiments of the present invention are not limited to the particular architecture illustrated in FIG. 5. Other laser and/or amplifier architectures are suitable for application of some embodiments, including architectures described in U.S. patent application Ser. No. 11/737,052, entitled "Method and System for Tunable Pulsed Laser Source," filed on Apr. 18, 2007, U.S. patent application Ser. No. 11/942,984, entitled "Fiber Amplifier with Integrated Fiber Laser Pump," filed on Nov. 20, 2007, and U.S. patent application Ser. No. 12/015,427, entitled "Seed Source for High Power Optical Fiber Amplifier," filed on Jan. 16, 2008, the disclosures of which are hereby incorporated by reference for all purposes.

Figure 6:
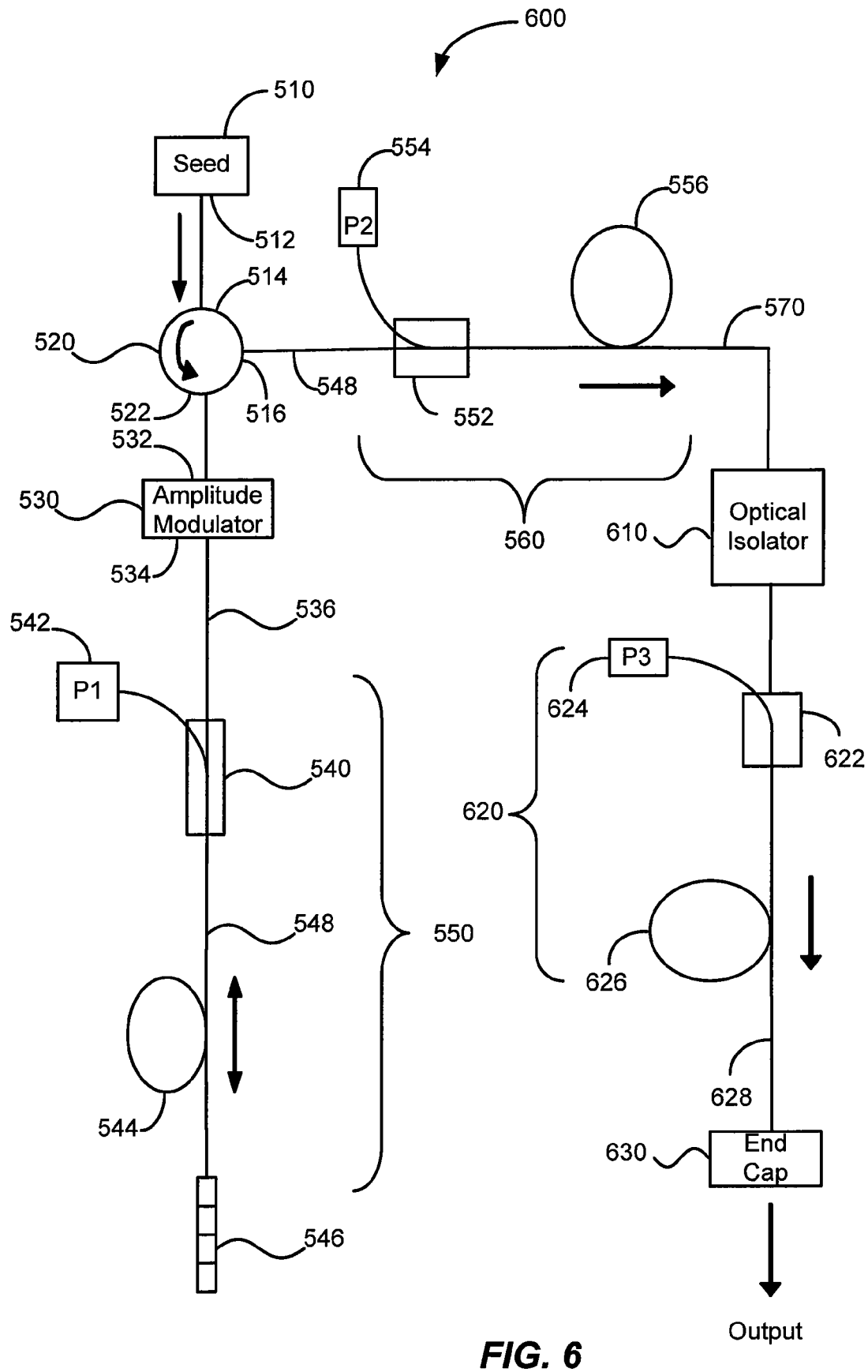
FIG. 6 is a simplified schematic diagram illustrating a high power fiber amplifier according to another embodiment of the present invention.

FIG. 6 is a simplified schematic diagram illustrating a high power fiber amplifier according to another embodiment of the present invention. For purposes of clarity, common elements between FIG. 5 and FIG. 6 are referenced with common reference numbers. The output 570 of the optical amplifier 560 is coupled to optical isolator 610. In the embodiment illustrated in FIG. 6, the optical isolator 610 includes one or more lengths of doped relay fiber, thus suppressing SBS and other non-linear effects. Exemplary optical isolators including doped relay fiber are illustrated in FIG. 2. A second single-pass optical amplifier 620 is illustrated as another fiber amplifier. The optical amplifier 620 includes fiber loop 626 and an optical coupler 622 receiving a pump signal from pump source 624. As discussed in relation to FIG. 5, the optical coupler 622 may include one or more lengths of doped relay fiber. Output fiber 628 is a doped relay fiber coupled to end cap 630 as discussed in relation to FIG. 1. Thus, many of the components exposed to high intensity light are configured to reduce SBS and other non-linear effects via the use of doped relay fiber.

It should be noted that although the pump coupler 622 has been illustrated as between the optical isolator 610 and the active fiber 626, this is not required by embodiments of the present invention. Pump couplers could be joined to the fiber amplifier sections, for example, between the end cap 630 and the length of active fiber 626. Thus, both forward pumping configurations, as illustrated in FIG. 6, and backward pumping configurations in which pump light travels in a direction opposing the signal light, are included within the scope of embodiments of the present invention. Similar placement of optical couplers 540 and 552 are applicable to optical amplifiers 550 and 560.

Figure 7:
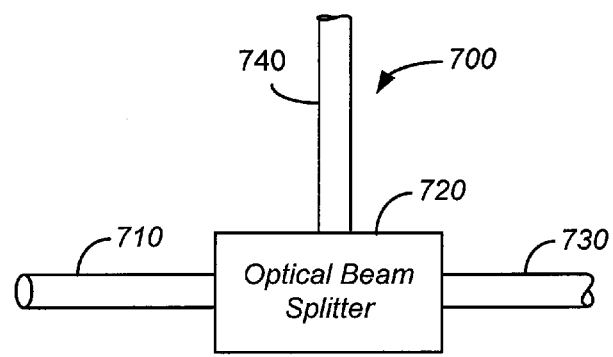
FIG. 7 is a simplified schematic diagram illustrating an optical beam splitter with reduced SBS according to an embodiment of the present invention.

An exemplary optical beam splitter including doped relay fiber is illustrated in FIG. 7. An input fiber 710 is coupled to an optical beam splitter 720. The input fiber 710 is an optically active fiber including a rare-earth doped fiber to reduce SBS present in the input fiber 710. The beam splitter 720 may split the beam into at least two or more beams. Each beam may have a different beam direction or different beam power. A first output fiber 730 and a second output fiber 740 are coupled to the beam splitter 720. In some embodiments, there may be a plurality of beams output from the beam splitter 720 and each beam may have substantially equal power. The output fibers may also be optically active fiber including a rare-earth doped fiber to reduce SBS present in the output fibers 730 and 740.

Embodiments of the present invention are not limited to the optical components discussed above. Other embodiments provide optical systems that include an optically active fiber (either an input or output fiber) connected to an optical component. The optically active fiber includes a rare-earth dopant ion. The optical component may include one or more of the following: an optical modulator, an optical switching element, a wavelength-division multiplexing (WDM) component, a fiber grating, a beam shaping element, an optical tap, a Diffractive Optical Element (DOE), or the like. One of ordinary skill in the art would recognize many variations, modifications, and alternatives.

In a particular embodiment, wavelength-division multiplexing (WDM) technology multiplexes multiple optical signals on a single optical fiber by using laser of different wavelengths to carry different signals, for example, in fiber optic communications applications. According to embodiments of the present invention, the single fiber may be an optically active fiber including a rare-earth dopant ion.

In another embodiment, an optical switch enables signals in optical fibers or integrated optical circuits to be selectively switched from one fiber to another. According to embodiments of the present invention, the optical fibers may include an optically active fiber including a rare-earth dopant ion.

In a further embodiment, a fiber Bragg grating (FBG), which is a type of reflector constructed in a short segment of optical fiber that reflects particular wavelengths of light and transmits all other wavelengths of light, may be optically connected to an active relay fiber. The fiber Bragg grating is constructed by adding a periodic variation to the refractive index of the fiber core, which generates a dielectric mirror over a particular wavelength range. The fiber Bragg grating may also be used as an inline optical filter to block certain wavelengths. One application of the fiber Bragg grating is in optical communications systems. The fiber Bragg grating is specifically used as filters or in optical multiplexers with an optical circulator. The FBG may be connected to at least one input fiber and one output fiber, where the input fiber or output fiber may be optically active fibers including a rare-earth dopant ion.

A Diffractive Optical Element (DOE) is a set of lengthwise and crosswise aligned identical unit patterns. The DOE with unit patterns diffracts a beam into a plurality of divided beams on an image plane. The DOE may be suitable for high speed and low cost laser processing. According to embodiments of the present invention, the input fiber connected to the DOE may be an optically active fiber including a rare-earth dopant ion.

According to embodiments of the present invention, a method of constructing an optical system includes connecting an optically active input fiber to an optical component, where the optically active input fiber includes a rare-earth dopant ion. The optical component may be one of the following: an optical coupler, an optical amplifier, an optical circulator, an optical isolator, an optical modulator, an optical switching element, a wavelength-division multiplexing (WDM), a fiber grating, a beam shaping element, an optical tap, a Diffractive Optical Element (DOE), or the like. The method further includes connecting an output fiber to the optical component, where the output fiber may be an optically active fiber including a rare-earth dopant ion. As described throughout the present specification, a benefit of using an optically active fiber is the reduction of SBS present in fibers coupled or connected to one or more of the above optical components.

Although some embodiments described above utilize a doped fiber connected to the input of the optical component, the invention is not limited to doped fiber pigtails on the input side of the optical component. In other embodiments, the doped fiber is connected to the output of the optical component or to both the input and the output of the optical component. Although a listing of optical components has been described herein, the list of optical components included within the scope of the present invention is not limited to the particular components described herein but also includes other optical components that are suitable for fiber coupling. One of ordinary skill in the art would recognize many variations, modifications, and alternatives.

While the present invention has been described with respect to particular embodiments and specific examples thereof, it should be understood that other embodiments may fall within the spirit and scope of the invention. It will be apparent to those skilled in the art that other alternatives, variations, and modifications are possible, and should be seen as being within the spirit and the scope of the invention. The scope of the invention should, therefore, be determined with reference to the appended claims along with their full scope of equivalents.

What is claimed is:

1. A laser amplifier comprising:
   a pump source;
   an optically active fiber having an input portion configured to receive a signal source and an output portion, the pump source being optically coupled to the optically active fiber;
   a doped output fiber optically coupled to the output portion of the optically active fiber, wherein the doped output fiber comprises a rare-earth element; and
   a beam expansion section joined to the doped output fiber, wherein the beam expansion section is characterized by a uniform index of refraction as a function of position.

2. The laser amplifier of claim 1 wherein the doped output fiber comprises a double-clad fiber.

3. The laser amplifier of claim 2 wherein the double-clad fiber comprises a core doped with the rare-earth element, a first cladding surrounding the core, and a second cladding surrounding the first cladding.

4. The laser amplifier of claim 1 further comprising a fiber splice joining the output portion of the optically active fiber and the doped output fiber.

5. The laser amplifier of claim 1 wherein the pump source is optically coupled to the optically active fiber through an optical coupler.

6. The laser amplifier of claim 5 wherein the optical coupler comprises:
   a first fiber including an input facet configured to receive the pump source;
   a second fiber including an input facet configured to receive the signal source, wherein the second fiber includes a rare-earth dopant ion; and
   a coupling section between the first fiber and the second fiber.

7. The laser amplifier of claim 1 wherein the doped output fiber includes a waveguide section having a cross-sectional area characterized by an index of refraction varying as a function of position.

8. The laser amplifier of claim 7 wherein an optical mode is contained in the doped output fiber and the optical mode is divergent in the beam expansion section.

9. The laser amplifier of claim 1 wherein the beam expansion section comprises a glass element.

* * * * *